Figure 1:
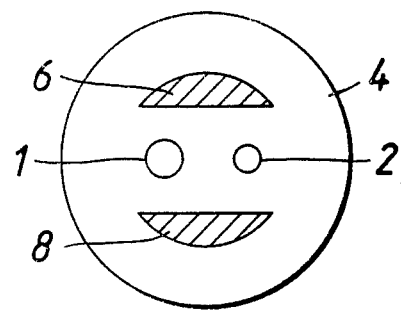

United States Patent [19]

Scrivener

[11] Patent Number: 4,925,269
[45] Date of Patent: May 15, 1990

[54] OPTICAL FIBRE STRUCTURE

[75] Inventor: Paul L. Scrivener, Shirley, England

[73] Assignee: Pirelli General plc, London, England

[21] Appl. No.: 236,038

[22] Filed: Aug. 23, 1988

[30] Foreign Application Priority Data

Sep. 17, 1987 [GB] United Kingdom ............... 8721860

[51] Int. Cl.$^5$ ............................................. G02B 6/22
[52] U.S. Cl. ............................. 350/96.33; 350/96.15; 350/96.29
[58] Field of Search ........................... 350/96.33, 96.29

[56] References Cited

U.S. PATENT DOCUMENTS

| | | | |
|---|---|---|---|
| 4,315,666 | 2/1982 | Hicks, Jr. .................. | 350/96.33 X |
| 4,478,489 | 10/1984 | Blankenship et al. ........ | 350/96.33 X |
| 4,480,897 | 11/1984 | Okamoto et al. ............. | 350/96.33 X |
| 4,515,436 | 5/1985 | Howard et al. ............... | 350/96.29 |
| 4,714,312 | 12/1987 | Thaniyavarn ................ | 350/96.11 X |

OTHER PUBLICATIONS

Special Optical Fibers by Simon B. Poole and David N. Payne Optical Fibre Group, Department of Electronics and Computer Science, The University, Southampton, Hampshire, SO9 5NH, UK.

Primary Examiner—John D. Lee
Assistant Examiner—Phan T. Heartney
Attorney, Agent, or Firm—Brooks Haidt Haffner & Delahunty

[57] ABSTRACT

An electrically tunable optical fibre structure comprising a length of optical fibre which includes two uniformly spaced monomode optical cores (1,2) located within a common cladding (4) so as to provide two optical guidance paths, the optical characteristics of at least the cores being different such as to give the two guidance paths different propagation constants the values of which coincide for a predetermined wavelength, so that optical energy at said wavelength will repeatedly transfer from one core to the other, characterized in that two electrodes (6,8,20) are provided within the cladding and are located with at least one core between them for applying an electrical field to that core whereby to alter its propagation constant by the electro-optic effect and hence to alter said wavelength, the structure thereby being tunable. Methods of making such a structure are also disclosed.

10 Claims, 3 Drawing Sheets

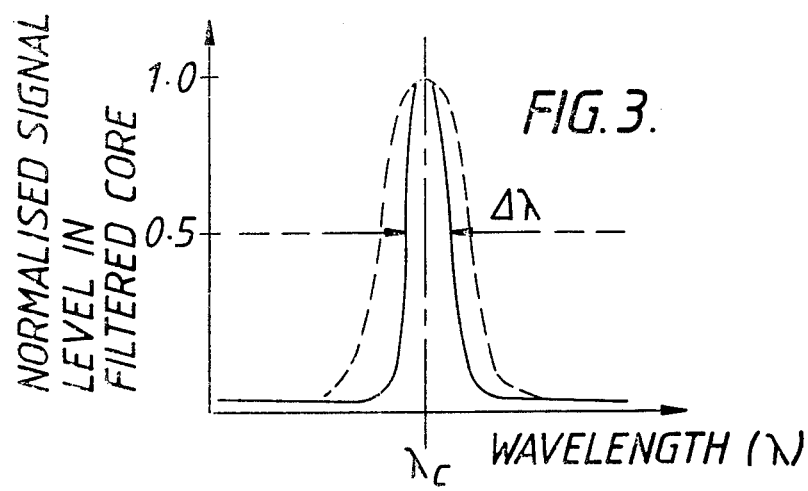
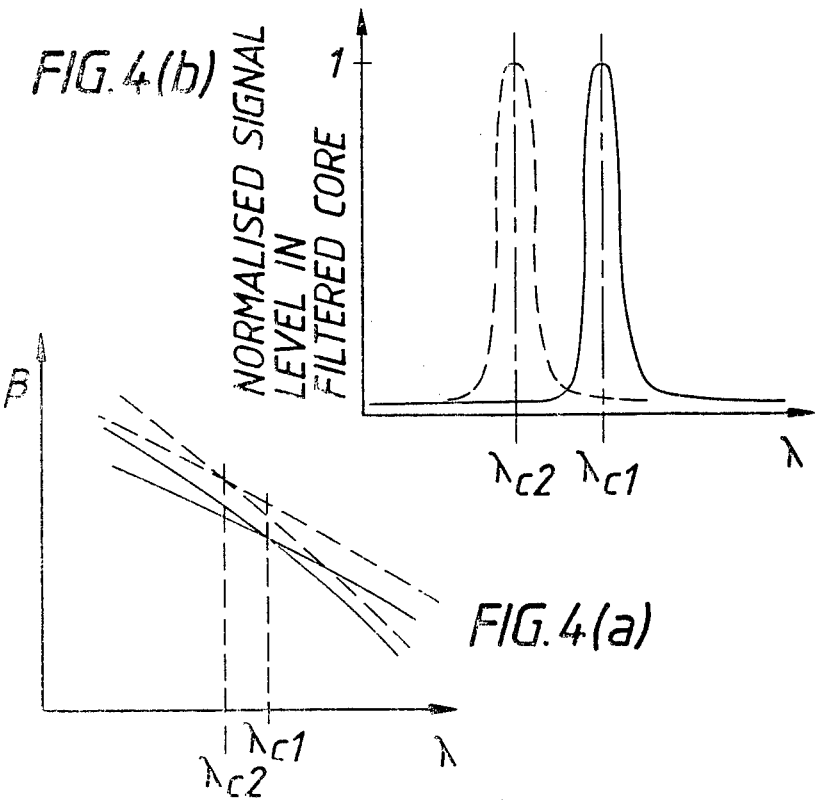

OPTICAL FIBRE STRUCTURE

This invention relates to optical fibre structures.

It is known that when two identical monomode optical cores are located within a common cladding (the cores being of a material having higher refractive index than that of the cladding), and the cores are sufficiently close together, optical coupling will occur between the two cores. When optical energy is introduced into one of the cores it travels primarily within the core itself but also to a limited degree in the cladding immediately surrounding the core so that in effect the core provides an optical guidance path which extends laterally beyond the limits of the core itself. When the cores are close enough together, the optical guidance paths actually overlap so that light initially travelling in one of the optical guidance paths is increasingly transferred into the other optical guidance path. All, or virtually all, of the optical energy transfers from one optical guidance path to the other by this process so that over a length of such fibre the proportions of energy travelling in the two optical guidance paths oscillate progressively between 100% in the one and 100% in the other. The distance over which all the energy transfers from one path to the other and then back again is often referred to as the "beat length" and is typically from a few millimeters to a few centimeters. The beat length is a function of wavelength and therefore, if more than one wavelength is introduced at the input of such a fibre, at a position which is numerous beat lengths further down the fibre 100% of one of the wavelengths will be travelling in one of the optical guidance paths whereas at least some proportion of all the other wavelengths will be travelling in the other optical guidance path. Thus, by terminating the fibre at this point a degree of filtering of one wavelength from the others can be achieved.

This principle has been applied to produce a fibre structure wavelength filter (disclosed in a paper by K. Okamoto and J. Noda in Electronics Letters 13th Feb. 1986, Vol. 22, No. 4) by coupling end to end alternate lengths of twin core fibre and single core fibre, the lengths of single core fibre being used to transmit the preferentially filtered light from the output of the preceding length of twin core fibre to one of the two cores of the subsequent length of twin core fibre. Each of the lengths of twin core fibre is such as to give preferential transfer or filtering for the same wavelength, so that each length of twin core fibre effectively removes a further proportion of all wavelengths but that particular one. Thus, a relatively narrow passband from end to end of the composite filter can be achieved if the number of lengths of twin core fibre is made great enough. However, it will be appreciated that the construction of such filters is relatively complex and expensive.

The repeated and complete transfer of optical energy from one optical guidance path to another which was described in relation to the prior art fibre structure wavelength filter only occurs at a wavelength for which the propagation constants of the two guidance paths are the same.

The propagation constant of a monomode optical guidance path is an indication of the speed at which light travels on that path and it is a function of the parameters of the optical core itself and the cladding which immediately surrounds the optical core. For a given structure, the propagation constant varies with wavelength, and it is well known that its value for a particular wavelength, and also the rate at which it varies as a function of wavelength, can to a degree be determined by suitable selection of core material, core diameter, cladding material, and the refractive index profile throughout the core and the immediately surrounding cladding.

In the prior art structure just described, the propagation constants of both paths were the same for all wavelengths since the two optical guidance paths themselves were identical.

In a paper entitled "Two-Core Optical Fibres:Experiment" at page 84, Journal of the Optical Society of America, January 1985, a two core structure was proposed in which the propagation constants were the same only at one particular wavelength. Consequently, all other wavelengths stay in that guidance path to which they were initially introduced, whereas the predetermined wavelength which the structure is designed to filter out oscillates between the two guidance paths and can be separated from the other wavelengths by terminating the length of the fibre structure at a point where most of the energy at that predetermined wavelength is travelling in the opposite path from all others. The predetermined wavelength is fixed by the physical construction of the fibre.

An optical wavelength filter in which the centre wavelength of the passband could be electrically varied or tuned was disclosed in a paper by R. C. Alferness and R. V. Schmidt in Applied Physics Letters 33(2) dated 15th July 1978. That filter was constructed using integrated optics techniques which are not capable of application to fibre-type structures.

It has not, hitherto, been possible to produce an optical fibre structure in which the coupling wavelength between two cores could be tuned or adjusted after completion of the structure.

An object of the invention is to provide such an optical fibre structure.

In accordance with the invention there is provided an electrically tunable optical fibre structure comprising a length of optical fibre which includes two uniformly spaced monomode optical cores located within a common cladding so as to provide two optical guidance paths, the optical characteristics of at least the cores being different such as to give the two guidance paths different propagation constants the values of which coincide for a predetermined wavelength, so that optical energy at said wavelength will repeatedly transfer from one core to the other, characterised in that two electrodes are provided within the cladding and are located with at least one core between them for applying an electrical field to that core whereby to alter its propagation constant by the electro-optic effect and hence to alter said wavelength, the structure thereby being tunable.

By incorporating electrodes within the body of the fibre itself, and hence very close to the core, a reasonably intense electrical field can be developed across the core even with a relatively low voltage between the electrodes. Then, even taking account of the limitations placed upon the materials used in the fibre, due to the need to achieve the desired optical performance and to be capable of formation into fibre, a shift of the propagation constant for one or both of the cores can be achieved, and a resulting detectable shift in the centre coupling wavelength.

The amount of wavelength shift available may be increased by the use of soft glasses for the tunable core or cores and the cladding, as will be described.

In a preferred structure according to the invention, the length of the optical fibre is such that when optical energy at the predetermined wavelength is introduced into one core at one end of the fibre it will be travelling primarily in the other core at the other end of the fibre whereby the structure is operable as a wavelength filter whose filter frequency is electrically tunable.

Thus, for the first time, an electrically tunable wavelength filter which can readily be interfaced with the components of an optical fibre signal handling system is provided, due to the fibre type structure of the filter.

In practice, wavelengths immediately adjacent to the one for which the filter is designed are to some degree passed by the filter. However, the width of the passband can be reduced by making the propagation constants for the two optical guidance paths diverge from each other as sharply as possible on both sides of the wavelength value for which they actually coincide. Further, because at all wavelengths except the predetermined wavelength itself less than 100% of the energy transfers repeatedly between the two optical guidance paths, the bandwidth is also reduced by increasing the number of energy transfers or beats that occur between the input and the output of the filter. This can be achieved either simply by increasing the length of the fibre, or by decreasing the spacing between the cores, which decreases the beat length and therefore increases the number of beats per unit length. For ease of manufacture, it is preferable to increase the length of the fibre in order to narrow the passband, because this places less tight tolerances upon the required length of the fibre (due to the relatively long beat length) and does not require the increased precision of core placement which would be required if the cores were to be placed closer together to achieve the same effect. However, practical considerations limit the maximum length desirable for the filter and for further reductions in bandwidth a reduction in the core spacing will be required.

From a further aspect, the invention provides a method of making an electrically tunable optical fibre structure comprising preparing two core rods which include optical cores having the desired different optical characteristics, inserting them in bores in an inner cladding body, making the outside of said body non-circular either before or after said insertion, sleeving said body with an internally circular tube to create spaces adjacent the non-circular parts of said body, drawing down the assembly thus obtained, and filling with electrode material the spaces between the drawn forms of the inner cladding body and the tube.

Figure 2A:
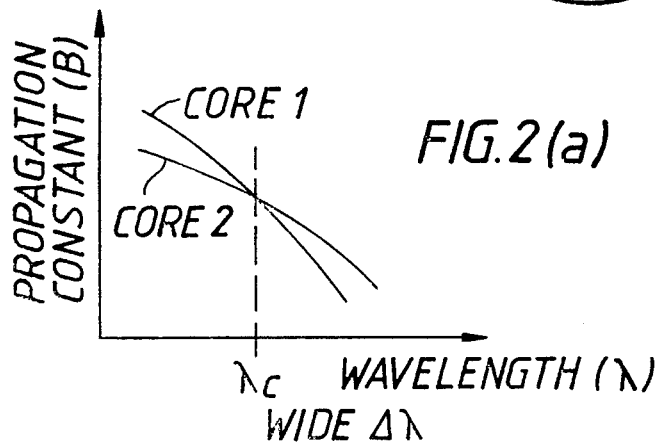
Figure 2B:
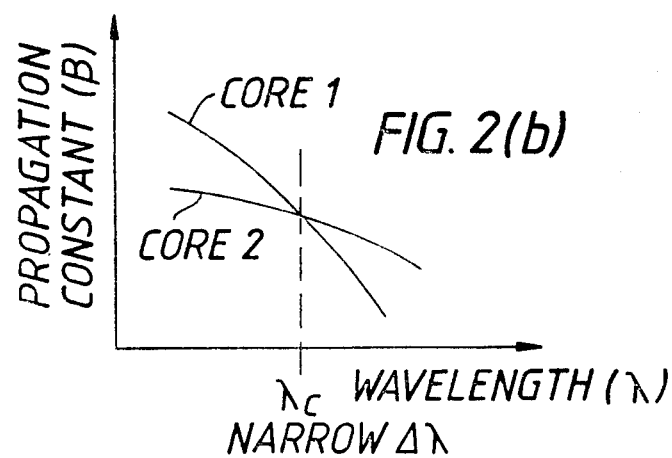
Figure 5:
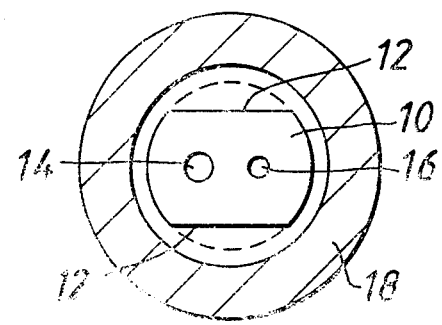
Figure 6:
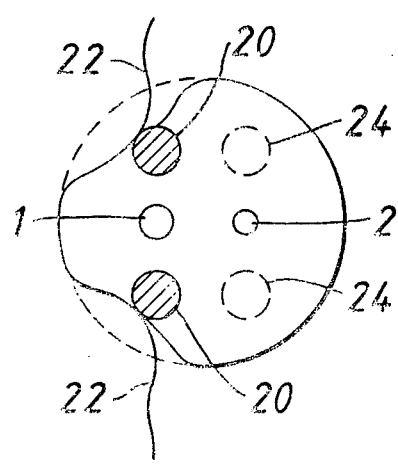

In order that the invention may be more clearly understood some embodiments thereof will now be described, by way of example, with reference to the accompanying drawings, in which:

FIG. 1 is a cross-sectional view of an electrically tunable optical fibre structure in accordance with the invention;

FIGS. 2(a) and 2(b) show propagation constants as a function of wavelength, which may be applied to the structure of FIG. 1;

FIG. 3 illustrates the broader and narrower passbands that can be achieved using propagation constants as illustrated in FIGS. 2(a) and 2(b) respectively;

FIGS. 4(a) and (b) respectively show how the propagation constants and passbands of a filter having the FIG. 1 structure may be varied;

FIG. 5 illustrates a stage in the manufacture of an optical fibre structure as shown in FIG. 1; and FIG. 6 shows a further type of electrically tunable optical fibre structure in accordance with the invention.

The optical fibre shown in FIG. 1 has two optical cores 1 and 2 located within a common cladding 4. The cores 1 and 2 are uniformly spaced apart throughout the length of the fibre. As has been mentioned previously, each of the cores then provides a respective optical guidance path which extends laterally to each side of the core and the spacing between the cores is made sufficiently small that their optical guidance paths will overlap so as to permit the transfer of optical energy between the cores as has been explained.

The material, diameter and refractive index profile of each core is selected, in a manner which is known in relation to a single core, such that the two cores have different propagation constants. FIG. 2(a) illustrates the case in which the cores are designed such that their propagation constants, which are a function of wavelength, coincide at a wavelength $\lambda_c$ but do not diverge very sharply from each other to each side of that wavelength. In contrast, FIG. 2(b) shows a case where the propagation constants are selected so as to coincide at wavelength $\lambda_c$ but to diverge from each other sharply to each side of this wavelength.

Given that a broad spread of wavelengths is introduced into one of the cores, for example core 1, at an end of the fibre, then in accordance with the principles of coupling between the cores which have been explained above, at a point in the fibre which lies an integral number of beat lengths for wavelength $\lambda_c$ beyond the entry point the spread of wavelengths in the "filtered" core 2 will be as shown in FIG. 3. In broken lines there is shown the broader wavelength spread which would become filtered into core 2 in the case of FIG. 2(a) when the propagation constants of the two cores remain closely similar to each other over a wider wavelength band. The full line shows the narrower passband which results when the propagation constants depart more sharply from each other with change of wavelength as illustrated in FIG. 2(b).

The width of the passband is determined not only by the relationship between the two propagation constants, but also by the spacing between the two cores, and (when the fibre structure is to form a discrete filter component in an optical fibre system) by the total length of the fibre which forms the filter and all of these variables are set to values which result in the desired level of performance whilst maximising ease of manufacture.

Regarding tunability, two metal electrodes 6 and 8 are incorporated into the structure of the fibre itself. Both of the electrodes are located such that both of the cores 1 and 2 lie between them. Although the glass material which is used for the cores 1 or 2 will exhibit only a relatively small electro-optic effect in response to the application of an electrical field, nevertheless the field strength can be made relatively high in relation to the voltage applied across the electrodes by incorporating the electrodes within the fibre itself. When a voltage is applied across the electrodes, the electro-optic effect results in a change in the refractive index of each of the cores and consequently a shift in the propagation constants of both of them as illustrated in FIG. 4(a). Consequently, there is a corresponding shift in the centre frequency of the filter passband as illustrated in FIG. 5(b).

In fact, the electro-optic effect causes a differential change in refractive index as between the light polarised perpendicular to the electrodes and that polarised parallel to the electrodes (i.e. vertically and horizontally in relation to the fibre as shown in FIG. 1). The refractive index shift is greater for the light whose plane of polarisation is perpendicular to the electrodes and to take advantage of the greater shift available with this polarisation, the fibre may be fed initially only with light having this polarisation. Alternatively, light polarised parallel to the electrodes may be filtered out at the output end of the filter using an analyser, thus leaving only the light polarised perpendicular to the electrodes.

To enhance the maximum frequency shift available, soft glasses (e.g. lead glass) may be used for the cores and cladding, many of these having a many times greater electro-optic effect than the harder glasses usually used for optical fibre cores and cladding. Also, to further enhance the maximum frequency shift, it is advantageous to select glass with a positive electro-optic coefficient for one core and a negative electro-optic coefficient for the second core, because for a given plane of polarisation this will result in the refractive indices, and propagation coefficients, of both cores being shifted, but in opposite directions, by the common applied field.

It is to be noted that a given length of filter fibre is appropriate for filtering out only one particular centre wavelength. Consequently, as the centre filtered wavelength is varied electrically, the fibre length will to some extent become inappropriate resulting in reduced transmission of the filtered centre wavelength. This difficulty is mitigated by increasing the beat length i.e. having the optical cores further apart.

FIG. 5 is useful in explaining the manufacture of a fibre structure as shown in FIG. 1. Two core rods are manufactured, for example by depositing glass material having the appropriate characteristics for the particular core inside respective silica support tubes using a modified chemical vapour deposition (MCVD) process. Most of the support tube material is then etched away so as to leave relatively little cladding material on the central optical core material, since the optical cores will need to be relatively close together. The two core rods are then elongated whilst heated in an electric furnace and are drawn to a few millimeters diameter.

A high purity silica rod 10 which is initially of circular cross-section has flats 12 machined on opposite sides of it and two bores 14 and 16 ultrasonically machined axially through it. The two drawn-down core rods, which are drawn down to a diameter which matches the bores 14 and 16 respectively, are then inserted in these bores and the composite assembly is inserted into a silica tube 18. The entire assembly is then drawn down to a diameter sufficiently small to ensure single mode operation over the entire scanning wavelength range of the filter.

In constructing the more sensitive version, the cores are formed from soft glass rods and inserted into bores in a soft glass cladding rod of a lower refractive index, the whole then being sheathed with a soft glass tube.

The resulting fibre is as shown in FIG. 1 but with spaces where the electrodes 6 and 8 are shown. These spaces are filled with a low melting point metal such as Wood's metal or an Indium/Gallium mixture, by enclosing the fibre length in a heated enclosure with one end in the liquid metal and simultaneously applying pressure at that end and vacuum at the opposite end of the fibre. The liquid metal is thus pumped into the spaces and solidifies to form the electrodes 6 and 8 when the fibre is cooled.

It should be noted that the circles 1 and 2 identified as optical cores in FIG. 1 represent the high refractive index optical core material. When the fibre is formed by a rod-in-tube process as explained with reference to FIG. 5, using core rods formed by MCVD within support tubes, then the outer surfaces of the rods (in their drawn-down form) actually lie slightly outside the circles by which the optical cores 1 and 2 are shown.

FIG. 6 shows a further form of electrically tunable fibre in accordance with the invention in which only core 1 is located between electrodes, these being indicated by reference numeral 20. This structure may be manufactured in a similar way to that of FIG. 5 but, instead of flats 12 being machined in the rod 10, two additional holes are bored through it ultrasonically on each side of the bore 14. These are then filled with metal to form the electrodes 20 after the fibre has been drawn. With this structure, the application of a voltage between the electrodes 20 will shift only one of the propagation constants to the broken line position as shown in FIG. 4(a) so that a different, and potentially greater, amount of centre wavelength shift can be obtained for a given applied voltage, compared with the FIG. 1 structure. Referring to FIGS. 2(a) and 2(b), it should also be noted that a greater range of wavelength shift can be obtained when the propagation constant curves are less divergent as in FIG. 2(a) rather than more divergent as in FIG. 2(b), but there will be a concomitant broadening of the passband. Preferably, in this structure the core materials are of a positive electro-optic coefficient glass and the cladding of a negative electro-optic coefficient glass, because this results in the refractive indices of the core in the field, and the cladding, shifting in opposite senses, which changes the propagation constant more than would a shift in the core alone. The same effect can be achieved by having negative coefficient cores and a positive coefficient cladding.

For the purpose of applying a voltage across the electrodes 6 and 8 in FIG. 1, or 20 in FIG. 6, part of the cladding of the fibre may be locally etched away using hydrogen fluoride until surface regions of the electrodes are exposed, and then fine electrical leads 22 may be ultrasonically welded to the electrodes, this being illustrated in FIG. 6 where the part of the cladding removed by etching is illustrated in broken lines.

FIG. 6 also shows in broken lines a second pair of electrodes 24 which may be located on opposite sides of the second core 2, so that the propagation constants of the two cores may be controlled independently of each other if desired.

It is anticipated that greater enhancement of the frequency shift could be obtained by making cores and/or cladding of a high Pockel coefficient single crystal material, since the Pockel effect, which occurs in such materials, is stronger than the Kerr effect.

I claim:

1. An electrically tunable optical fibre structure comprising a length of optical fibre which includes two uniformly spaced monomode optical cores (1,2) encircled by a common cladding (4) having a refractive index different from the refractive index of the cores so as to provide two optical guidance paths, the two guidance paths having different propagation constants the value of which coincide for a predetermined wavelength, so that optical energy at said wavelength will repeatedly transfer from one core to the other, characterised in that two electrodes (6,8,20) are provided within the cladding and are located with at least one core between them for applying an electrical field to that core whereby to alter its propagation constant by the electro-optic effect and hence to alter said wavelength, the structure thereby being turnable.

2. An optical fibre structure as claimed in claim 1 characterised in that the length of the optical fibre is such that when optical energy at the predetermined wavelength is introduced into one core at one end of the fibre it will be travelling primarily in the other core at the other end of the fibre whereby the structure is operable as a wavelength filter whose filter frequency is electrically tunable.

3. An optical fibre structure as claimed in claim 1 or claim 2, wherein the two electrodes (6,8) are located with both cores (1,2) between them.

4. An optical fibre structure as claimed in claim 3 wherein one core has a positive electro-optic coefficient and the other a negative electro-optic coefficient.

5. An optical fibre structure as claimed in claim 1, wherein the two electrodes (20) are located with only one (1) of the cores between them.

6. An optical fibre structure as claimed in claim 5 wherein the core (1) which is located between electrodes (20) has a positive electro-optic coefficient and the cladding (4) has a negative electro-optic coefficient, or vice versa.

7. An optical fibre structure as claimed in claim 5 or claim 6, comprising two further electrodes (24) located with the other core (2) between them.

8. An optical fibre structure as claimed in claim 1 wherein at least said one core is of a soft glass exhibiting a relatively large electro-optic effect.

9. An optical fibre structure as claimed in claim 8 wherein the common cladding (4) is of a soft glass exhibiting a relatively large electro-optic effect.

10. A method of making an optical fibre structure as claimed in claim 1, comprising preparing two core rods, inserting them in bores (14, 16) in an inner cladding body (10), making the outside of said body non-circular (12) either before or after said insertion, sleeving said body with an internally circular tube (18) to create spaces adjacent the non-circular parts of said body, drawing down the assembly thus obtained, and filling with electrode material the spaces between the drawn forms of the inner cladding body and the tube, said two core rods being prepared to provide two guidance paths in the resulting structure with different propagation constants which coincide at said predetermined wavelength.

* * * * *

UNITED STATES PATENT AND TRADEMARK OFFICE
CERTIFICATE OF CORRECTION

PATENT NO. : 4,925,269

DATED : May 15, 1990

INVENTOR(S) : Scrivener

It is certified that error appears in the above-identified patent and that said Letters Patent is hereby corrected as shown below:

Col. 1, line 27, change the two arrows after "length" to a quote (");

Col. 7, line 10, change "turnable" to --tunable--.

Signed and Sealed this

Twenty-ninth Day of October, 1991

Attest:

HARRY F. MANBECK, JR.

*Attesting Officer*   *Commissioner of Patents and Trademarks*